Patented July 7, 1931

1,813,358

UNITED STATES PATENT OFFICE

HUGH T. O'NEILL AND ARTHUR J. HARRIMAN, OF WASHINGTON, DISTRICT OF COLUMBIA

ART OF TREATING FRUITS

No Drawing.   Application filed May 27, 1930. Serial No. 456,283.

This invention relates to improvements in treating fruit and more particularly to a novel method of classifying fruit and preparing same for shipment.

In our application S. N. 452,128, filed May 13, 1930, we have disclosed a method of detecting abrasions in fruits, which method involves the treatment or dipping of fruits in a bath containing a reagent or reagents adapted to react with the tannin bodies of the rind to form distinctive colorations. The method disclosed in the above-identified application also comprehended the adsorption of dyes from a treating bath into epidermal abrasions to produce other like distinctive marks.

We have found that improved results in the formation of such distinctive markings in abrasions, which, in and of themselves, are usually not susceptible of detection in the course of ordinary inspection methods, may be obtained by subjecting the fruit being classified to a two-step process, in which the fruit are passed through two or more baths each of which contains a compound adapted to be sorbed into the abrasions on the rind or dermis of the fruits undergoing treatment. The reagents used are so chosen that any two successive compounds when brought into contact with each other under reactive conditions, such as the presence of moisture, or an aqueous medium react to form distinctly colored compounds.

As examples of the novel improvement in the present invention, fruit, such as oranges, lemons etc., may be submitted to an initial treatment with a colorless reactive salt in solution such as the soluble aluminum salts, the time of passage of the fruit through the solution being such as to permit sufficient sorption of the saline element into the otherwise invisible punctures or apertures in the skin of the fruit. After passage through such a bath and removal of any excess of solution, the so-treated fruit may be passed through a bath containing a dilute dye adapted to form a colored lake with the aluminum compound present in the abrasions. A colorless or slightly colored compound such as aluminum acetate, in solution, may constitute the preferred reagent for use in the first bath and a soluble dye such as sodium alizarin sulfonate may be used in the second bath.

A fruit, such as an orange, which has been treated with a reactive salt such as the aluminum acetate noted, will form a deeply colored compound with the sodium alizarin sulfonate, above mentioned. Solutions of the sodium salt of alizarin give colored precipitates called "lakes" with solutions of the salts of most metals. The precipitates with barium and calcium salts are purple, while those of aluminum and tin are red; ferric salts yield black-violet precipitates, while ferrous salts are violet. The metallic salt used, therefore, determines the color of the precipitate formed. Other metals may be used for this purpose, but care should be taken to use those forming relatively non-toxic compounds, where the products treated are intended for direct human consumption. Where toxic compounds are formed, as would occur with the use of compounds of silver, lead, mercury and copper, for example, the products formed should be carefully removed by appropriate chemical treatments, before the treated articles are sold directly, or further processed for human consumption.

While the use of compounds having an organic base has been disclosed it will, of course, be appreciated that colored compounds of suitable tinctorial power may be formed, in situ, in the abrasions on the surface of fruits, by reacting metallic salts, as above noted, with reagents, such as hydrogen sulfide, or the like, in gaseous form, or in aqueous solution, whereby to form highly colored precipitates. The sulphides of iron, copper, lead, silver, mercury, cadmium and the like reacting metals, are suited to the purposes of this invention. However, iron is the preferred reagent as its compounds are relatively non-toxic.

The use of a gaseous reagent, such as hydrogen sulphide, is of particular advantage, as it permits a marked saving in time of treatment, by avoiding the use of a second aqueous bath. The preliminary treated fruit may be roughly dried and passed through a gas-tight chamber containing a reactive gas, such as hydrogen sulphide, which is adapted to form colored precipitates with the metallic salts deposited in the abrasions.

The novel invention herein disclosed is particularly adapted for use with fruits and vegetables which have a relatively small amount of tannin due to the ripening process. In the ripening process, the tannins and associated bodies are progressively converted into sugars and flavoring bodies, with the result that tree-ripened fruit may contain insufficient tannin bodies to give a direct reaction with a reagent, as more particularly set forth and claimed in our application, S. N. 452,128, above referred to. The formation of distinctively colored compounds by a two-step process, as herein disclosed, is intended to supplement our prior one-step process, and is to be used under conditions characterized by an absence of naturally occurring reagents, such as tannic acid and other tannin bodies.

Where desired, the fruit may be treated with color bases which have been reduced to form the so-called "leuco-bases". The fruit impregnated with the "leuco-bases" may then be subjected to an oxidizing treatment, whereby to reform the color bases. As examples of compounds suitable for this purpose may be mentioned pararosaniline, rosaniline, methyl violet, crystal violet, malachite green, and indoxyl, which is the leuco-base of indigo. The choice of the proper compound to use will be governed by the usual considerations of toxicity, and ease of removal of the colored compounds from the treated fruit.

While the use of a gaseous reagent, such as hydrogen sulphide, has been disclosed, solutions of soluble sulphides may be used with good results. Owing to its low cost, and ease of solution, sodium sulphide may be made use of to advantage.

If a gaseous treatment is preferred for the second step of the process, and the relatively high toxicity of hydrogen sulphide, per se, militates against its use, other gaseous reagents, such as ozone, may be used in conjunction with soluble manganese salts. The resulting manganese oxide is black and is present in sufficiently small amounts to avoid any danger from possible ingestion.

It will now be understood that there has been provided a novel process for classifying fruits for shipment and for determining the soundness, and potential or existing infection thereof, which process is easy of manipulation as well as characterized by extreme simplicity and low cost, permitting the sale of guaranteed, sound fruit, which is susceptible of keeping without spoilage for long periods of time.

We claim as our invention:

1. The process of treating fruit to determine its susceptibility to mycological infection, comprising the steps of subjecting the fruit to the action of a reagent adapted to be sorbed into surface abrasions and reacting the so-treated fruit with other reagents whereby to form colored compounds with said first-named reagent, and subsequently separating the marked fruit from the sound, unmarked fruit.

2. The process of treating fruit to determine its susceptibility to mycological infection, comprising the steps of subjecting the fruit to the action of a reagent adapted to be sorbed into surface abrasions, said reagent being in the leuco form, and then exposing the so-treated fruit to the action of a reagent adapted to transform the leuco form of the first said reagent to the chromophoric form thereof.

3. In the classifying of fruit to determine its keeping qualities, the mehod of rendering substantially microscopic abrasions macroscopic, including sorbing a mineral salt into said abrasions, and then applying a reagent adapted to form lakes with said salt.

4. In the classifying of fruit to determine its keeping qualities, the method of rendering substantially microscopic abrasions macroscopic, including sorbent an inorganic salt into said abrasions, and then forming lakes with said salt.

5. In the classifying of fruit to determine its keeping qualities, the method of rendering substantially microscopic abrasions macroscopic, including sorbing an inorganic compound into said abrasions, and then forming lakes with said compound.

6. In the classifying of fruit to determine its keeping qualities, the method of rendering substantially microscopic abrasions macroscopic, including depositing a potentially reactive compound in said abrasions, and reacting the so-treated fruit with other reagents adapted to form colored compounds with said first-named reagents.

7. In the classifying of non-tannin bearing fruit to determine its susceptibility to mycological infection, the method of rendering substantially miscroscopic abrasions macroscopic, including depositing a compound of low tinctorial power in said abrasions, and increasing said tinctorial power by reaction with other reagents.

8. A method of indicating the condition of fruit which is substantially ripe and characterized by a low tannin content, for the purpose of facilitating inspection and culling, comprising separately treating the fruit with a series of compounds adapted to penetrate abrasions in the skin of the fruits and interact to form colored compounds.

9. In the process of grading fruit to separate sound fruit from fruit which is infected or potentially unsound due to surface abrasions, the steps comprising subjecting the fruit to the action of a reagent adapted to be absorbed into such surface abrasions, subjecting the so-treated fruit to the action of a second reagent adapted to form distinctively colored compounds with said first-named reagent, and separating the marked fruit from the sound, unmarked fruit.

In testimony whereof we affix our signatures.

HUGH T. O'NEILL.
ARTHUR J. HARRIMAN.